United States Patent [19]
Willeford

[11] Patent Number: 5,301,990
[45] Date of Patent: Apr. 12, 1994

[54] AUTOMATIC CLOSURE FOR SHOCK ATTENUATING APPARATUS

[76] Inventor: Lorene F. Willeford, 723 Montgomery St., Napa, Calif. 94559

[21] Appl. No.: 89,368

[22] Filed: Jul. 9, 1993

[51] Int. Cl.5 .................................. B60R 19/20
[52] U.S. Cl. ........................................ 293/107
[58] Field of Search ............... 293/107, 132, 134, 108, 293/110; 188/377, 155, 266; 267/116

[56] References Cited

U.S. PATENT DOCUMENTS

| | | | |
|---|---|---|---|
| 3,284,122 | 11/1966 | Rich | 293/107 |
| 3,512,822 | 5/1970 | Rich et al. | 293/107 |
| 3,545,802 | 12/1970 | Rich | 293/107 |
| 3,572,465 | 3/1971 | Olson | 188/377 |
| 3,588,158 | 6/1971 | Ford | 293/107 |
| 3,664,653 | 5/1972 | Walker | 293/107 X |
| 3,717,370 | 2/1973 | Walker | 293/107 |
| 4,205,811 | 6/1980 | Palm et al. | 188/266 X |

Primary Examiner—Joseph D. Pape
Attorney, Agent, or Firm—Larry D. Johnson

[57] ABSTRACT

Impact is attenuated by a hollow resilient elongated one-piece body formed by a substantially flat reinforced rear wall, a top wall and front, side and bottom walls defining a cavity which is filled with water. A plurality of apertures are provided in the top wall, each of which apertures is defined by resilient walls and is closed by at least one resiliently deformable flap member adjacent to and covering the aperture. In response to a strong impact against the front wall of the body, a series of physical steps occur which result in deflection of the flap members from, followed by water from the cavity upwardly through, the apertures. The flap members return to a position adjacent to and covering the apertures after impact.

2 Claims, 2 Drawing Sheets

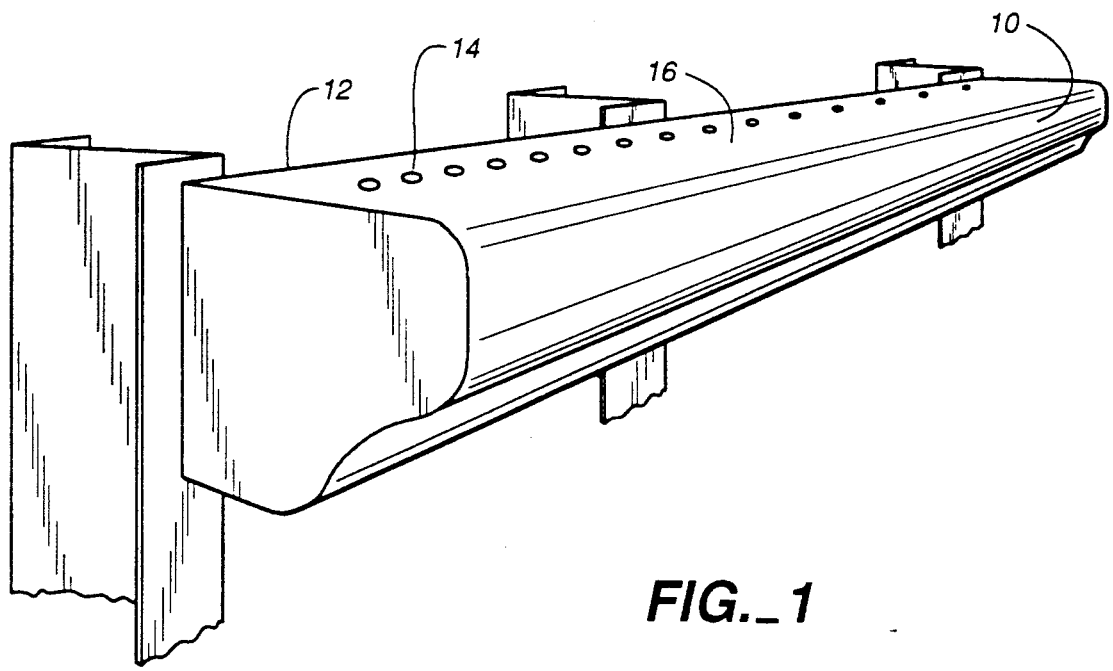
FIG._1
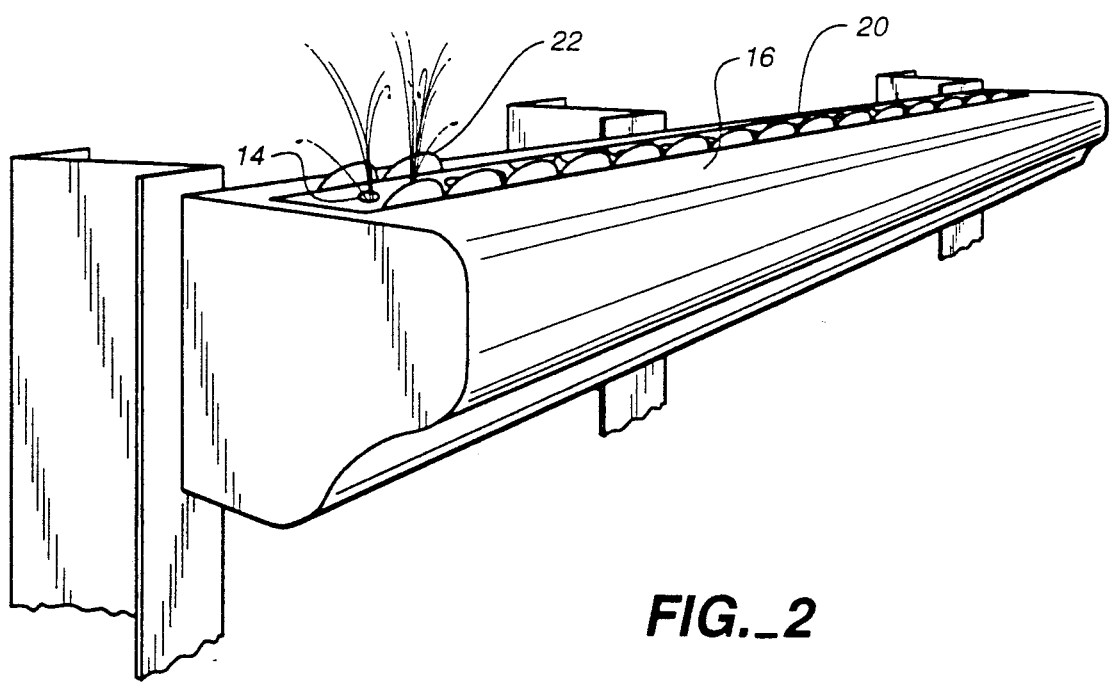
FIG._2

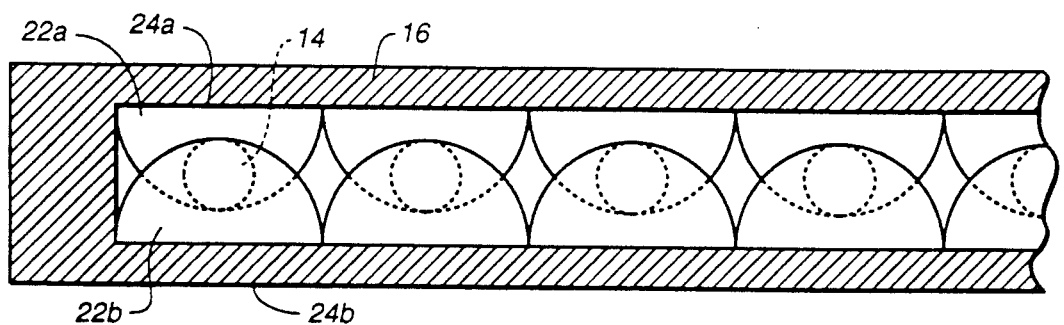
FIG._3
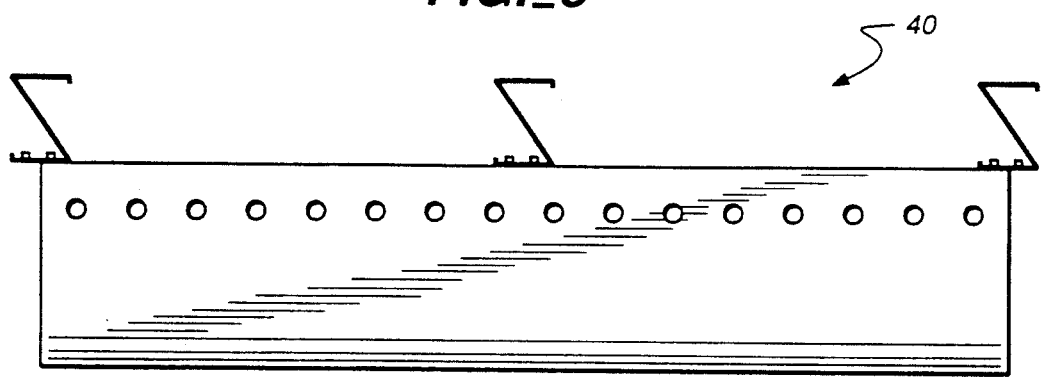
FIG._4
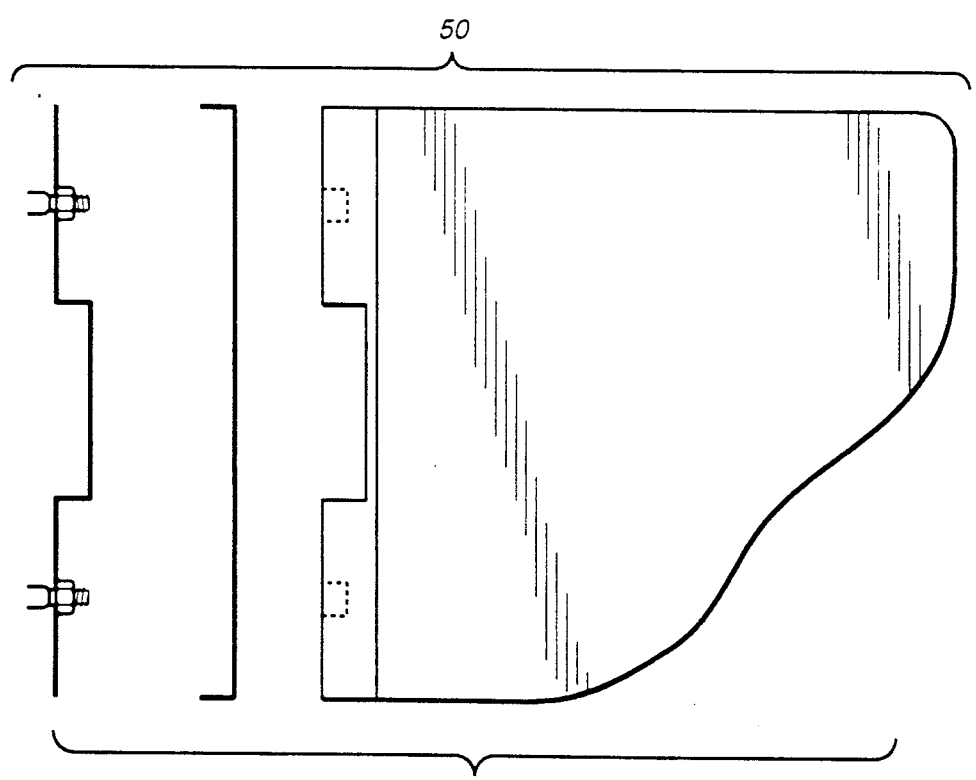
FIG._5

AUTOMATIC CLOSURE FOR SHOCK ATTENUATING APPARATUS

BACKGROUND OF THE INVENTION

1. Field of the Invention

This invention relates generally to a shock attenuating apparatus, and more specifically to an improved automatic closure device for a liquid shock attenuating apparatus.

2. Description of the Prior Art

This invention is related to and an improvement of the invention described in U.S. Pat. No. 3,572,465 issued Mar. 3, 1971 to William Carl Olson for a Liquid Shock Attenuating and Preventing Device, the disclosure of which is incorporated by reference herein. That patent taught a shock attenuating device that may be adapted for use on, or in connection with automobile bumpers, roadway guardrails and the like. U.S. Pat. No. 3,572,465 described a device in which impact is attenuated by a hollow resilient elongated one-piece body formed by a substantially flat reinforced rear wall, a top wall and front, side and bottom walls defining a cavity which is filled with water. A plurality of apertures are provided in the top wall, each of which apertures is defined by resilient walls and is closed by a resiliently deformable plug in frictional engagement with the aperture walls. In response to a strong impact against the front wall of the body, a series of physical steps occur which result in ejecting the plugs from, followed by water from the cavity upwardly through, the apertures.

However, in this arrangement, the plugs are left outside the apertures after ejection. This is not only aesthetically unsightly, but also leaves the plugs exposed to damage or removal. Furthermore, the apertures are left open, thereby obviating the systems ability to attenuate a subsequent impact (as in a chain-reaction accident).

SUMMARY OF THE INVENTION

The automatic closure for shock attenuating apparatus of this invention provides an improved pressure release system for a liquid shock attenuating apparatus such as that described in Olson U.S. Pat. No. 3,572,465. Impact is attenuated by a hollow resilient elongated one-piece body formed by a substantially flat reinforced rear wall, a top wall and front, side and bottom walls defining a cavity which is filled with water. A plurality of apertures are provided in the top wall, each of which apertures is defined by resilient walls and is closed by at least one resiliently deformable flap member adjacent to and covering the aperture. In response to a strong impact against the front wall of the body, a series of physical steps occur which result in deflection of the flap members from, followed by water from the cavity upwardly through, the apertures. The flap members return to a position adjacent to and covering the apertures after impact.

Accordingly, in this arrangement, there are no plugs to be left outside the apertures after ejection, but rather the flap members are temporarily deflected and then return to their original position. This is more aesthetically pleasing, and avoids potential plug damage or removal. Furthermore, the apertures are again closed after the initial impact, enabling the system to be able to attenuate a subsequent impact (as in a chain-reaction accident).

BRIEF DESCRIPTION OF THE DRAWINGS

FIG. 1 is a perspective view of a liquid shock attenuating apparatus as installed on a roadway guardrail and including a plurality of apertures in the top wall thereof, but without incorporation of the automatic closure device of this invention;

FIG. 2 is a perspective view of the liquid shock attenuating apparatus of FIG. 1 incorporating the automatic closure device of this invention, consisting of a plurality of deformable flap members adjacent to and covering the plurality of apertures in the top wall of the body of the apparatus;

FIG. 3 is a top plan view of a portion of a liquid shock attenuating apparatus of this invention, illustrating a pair of opposed and overlapping flap members installed over each aperture in the top wall of the body of the apparatus;

FIG. 4 is a top plan view of a typical roadway guardrail support installation for a liquid shock attenuating apparatus; and FIG. 5 is a side elevation view of a typical roadway guardrail support mounting arrangement for a liquid shock attenuating apparatus.

DETAILED DESCRIPTION OF A PREFERRED EMBODIMENT

FIG. 1 is a perspective view of a liquid shock attenuating apparatus 10 as installed on a roadway guardrail 12 and including a plurality of apertures 14 in the top wall 16 thereof, but without incorporation of the automatic closure device of this invention. Prior art shock attenuating apparatus, such as disclosed in Olson U.S. Pat. No. 3,572,465 described supra, provided resiliently deformable plugs to close the apertures.

FIG. 2 is a perspective view of the liquid shock attenuating apparatus of FIG. 1 incorporating the automatic closure device 20 of this invention, consisting of a plurality of deformable flap members 22 adjacent to and covering the plurality of apertures 14 in the top wall 16 of the body of the apparatus. The action of these closures (flap members 22) is somewhat analogous to the deformable plugs of the prior art, but superior in that they are automatically returned to a position adjacent to and covering the apertures after impact by their elastic tendency.

Flap members 22 are preferably made of a polyurethane elastomer material such as Vibrathane castable urethane prepolymer of approximately 80 shore durometer. Other materials of varying characteristics may of course be used for different applications.

FIG. 3 is a top plan view of a portion of a liquid shock attenuating apparatus of this invention, illustrating a pair of opposed and overlapping flap members 22a, 22b installed over each aperture 14 in the top wall 16 of the body of the apparatus. Each of these flaps 22a, 22b may be scored along their base 24a, 24b respectively, to enhance deformation and displacement of the flap. For certain applications, these flaps may be recessed into the top wall 16, yielding an aesthetically pleasing "flush" appearance. This would be appropriate for use as an automobile bumper, where smooth exterior lines are desirable.

Accordingly, the invention provides an impact attenuating device for disposition in association with a first object (such as a bumper or guardrail) over an area thereof which may collide with a second object of substantial mass in a direction of impact. The device comprises an elongated, hollow one-piece resilient body having a substantially flat rear wall, a top wall and front, side and bottom walls defining an elongated cavity. The cavity is filled with water, and the rear wall is preferably being reinforced by an elongated, rigid member to be secured to the first object. The top wall of the body has portions extending parallel to the direction of impact and defining a plurality of upwardly directed apertures. A plurality of resiliently deformable flap members are disposed adjacent to and covering the apertures, and are adapted for deformation vertically from the respective apertures. Upon impact of the second object against the front wall of the body at a speed in excess of several miles per hour and in the impact direction, transverse to the direction of flap member deformation, pressure increases in the body until a number of the flap members are deformed and displaced from their respective apertures, the number depending upon the severity of the impact. Water is ejected through the apertures from which the respective flap members have been displaced as pressure of the water in the body decreases, followed by at least another pressure increase during which relative speed between the two objects decreases materially.

FIG. 4 is a top plan view of a typical roadway guardrail support installation 40 for a liquid shock attenuating apparatus.

FIG. 5 is a side elevation view of a typical roadway guardrail support mounting arrangement 50 for a liquid shock attenuating apparatus.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. An impact attenuating device for disposition in association with a first object over an area thereof which may collide with a second object of substantial mass in a direction of impact, the device comprising an elongated, hollow one-piece resilient body having a substantially flat rear wall, a top wall and front, side and bottom walls defining an elongated cavity, the cavity filled with water, the rear wall being secured to the first object, the improvement comprising:

the top wall of the body having portions thereof extending parallel to said direction of impact and defining a plurality of upwardly directed apertures;

a plurality of resiliently deformable flap members adjacent to and covering said apertures, said flap members adapted for deformation vertically from the respective apertures;

so that upon impact of said second object against the front wall of the body at a speed in excess of several miles per hour and in said impact direction, transverse to the direction of flap member deformation, pressure increases in said body until a number of the flap members are deformed and displaced from their respective apertures, the number depending upon the severity of the impact so that water is ejected through the apertures from which the respective flap members have been displaced as pressure of the water in the body decreases, followed by at least another pressure increase during which relative speed between the two objects decreases materially.

2. The impact attenuating device of claim 1 wherein said flap members return to a position adjacent to and covering the apertures after impact.

* * * * *